United States Patent [19]
Adams et al.

[11] Patent Number: 5,967,708
[45] Date of Patent: Oct. 19, 1999

[54] REACTOR VESSEL HEAD TOOL POSITIONING DEVICE

[75] Inventors: Larry A. Adams, Goode; James E. McCann, Lynchburg, both of Va.

[73] Assignee: Framatome Technologies, Inc., Lynchburg, Va.

[21] Appl. No.: 09/041,142

[22] Filed: Mar. 12, 1998

[51] Int. Cl.[6] ................................................. B23B 45/14
[52] U.S. Cl. ..................... 408/115 R; 376/260; 376/205; 376/203; 408/79; 408/97; 269/1; 269/2; 29/723
[58] Field of Search .................................. 376/249, 263, 376/205; 408/129, 115 R, 79, 97; 269/1, 2, 83.7, 152, 228; 294/93; 414/3, 8; 29/723

[56] References Cited

U.S. PATENT DOCUMENTS

| | | | |
|---|---|---|---|
| 2,344,143 | 3/1944 | Harding | 7/1 |
| 3,557,659 | 1/1971 | Harris | 90/12 |
| 3,687,007 | 8/1972 | Harris | 90/12 |
| 3,800,391 | 4/1974 | Westbrook | 29/255 |
| 3,819,171 | 6/1974 | Sendoykas et al. | 269/228 |
| 3,872,565 | 3/1975 | Ritz et al. | 29/200 P |
| 4,271,638 | 6/1981 | Creech | 51/241 S |
| 4,301,699 | 11/1981 | Butler | 82/34 R |
| 4,406,566 | 9/1983 | Bauer | 408/122 |
| 4,445,811 | 5/1984 | Sanders | 409/182 |
| 4,519,169 | 5/1985 | Smith | 51/241 S |
| 4,652,186 | 3/1987 | Sverdlin | 408/81 |
| 4,980,117 | 12/1990 | Blaushild | 376/205 |
| 5,150,496 | 9/1992 | Bromley | 29/33 T |
| 5,209,614 | 5/1993 | Matthews | 408/1 R |
| 5,309,626 | 5/1994 | Tolino | 29/723 |
| 5,593,257 | 1/1997 | Fuchs | 409/218 |

FOREIGN PATENT DOCUMENTS

7605008  5/1977  Netherlands ........................ 376/263

*Primary Examiner*—Charles T. Jordan
*Assistant Examiner*—Jack Keith
*Attorney, Agent, or Firm*—Rhodes & Mason, PLLC

[57] ABSTRACT

A tool fixture device for positioning tools to repair defects adjacent to the sealing grooves in a pressure vessel head. The device includes a two pair of parallel, spaced apart, arcuate segments adapted to fit into one of the sealing grooves. A support plate is attached to the first and the second pair of parallel, spaced apart, arcuate segments. The fixture includes a plurality of threaded rods for expanding the ends of the parallel arcuate segments to engage the inside walls of one of the grooves to hold the fixture in place. In the preferred embodiment, a tool positioner is adapted to be attached to the support plate for positioning a repair tool to permit the repair tool to be used to repair defects adjacent to the sealing grooves. The tool positioner includes a planar table and a tool jig attached to the planar table for receiving the repair tool.

22 Claims, 4 Drawing Sheets

REACTOR VESSEL HEAD TOOL POSITIONING DEVICE

BACKGROUND OF THE INVENTION (1) Field of the Invention

The present invention relates generally to the repair and maintenance of nuclear reactor pressure vessel heads and, more particularly, to a tool positioning device for positioning tools to repair defects adjacent to sealing grooves in a nuclear reactor pressure vessel head.

(2) Description of the Prior Art

The reactor pressure vessels (PVs) of pressurized water nuclear reactors (PWRs) and boiling water reactors (BWRs) must be opened periodically for maintenance and/or repair. This process involves lifting the reactor head for access to the reactor internals and later reinstalling the head when maintenance is complete. For certain types of PWR's this maintenance includes replacing two O-rings on the underside of the reactor head perimeter. Because the reactor heads are quite heavy, in some cases weighing over 20 tons, and quite large, reaching diameters over 20 feet, it is impractical to turns heads over for easy access to the O-rings. As a consequence, workers replacing the O-rings must work over their heads in an awkward fashion. Aligning tools correctly for work on the PV head can be difficult particularly as workers begin to tire. Compounding the problem is the fact that the reactor head may be quite radioactive requiring workers to wear bulky protective clothing.

The reactors which are the object of the present invention may include two concentric O-rings which are recessed into the PV head. As will be discussed in more detail below, steps are taken to ensure that hardware components used to hold the O-rings in place do not fall into the reactor core.

It follows that any tool which can expedite whatever steps are necessary to replace the O-rings will result in cost savings by reducing reactor down time, reduced personnel radiation exposure, and provide a better quality finished product.

Thus, there remains a need for a new and improved tool for working on the underside of a PV head that permits precise placement of a tool while, at the same time, reduces worker fatigue and radiation exposure time.

SUMMARY OF THE INVENTION

The present invention is directed to a tool fixture device for positioning tools to repair defects adjacent to the sealing grooves in a pressure vessel head. The device includes a two pair of parallel, spaced apart, arcuate segments adapted to fit into one of the sealing grooves. A support plate is attached to the first and the second pair of parallel, spaced apart, arcuate segments. The fixture includes a plurality of threaded rods for expanding the ends of the parallel arcuate segments to engage the inside walls of one of the grooves to hold the fixture in place.

In the preferred embodiment, a tool positioner is adapted to be attached to the support plate for positioning a repair tool to permit the repair tool to be used to repair defects adjacent to the sealing grooves. The tool positioner includes a planar table and a tool jig attached to the planar table for receiving the repair tool.

Also, in the preferred embodiment, the planar table includes a plurality of indexing slots along at least one edge and the tool fixture includes a corresponding tab whereby the planar table may be positioned along discrete intervals on the tool fixture.

The tool jig attached to the planar table for receiving the repair tool includes a XY table for precisely positioning the repair tool and a tool opening for precisely positioning the repair tool.

Accordingly, one aspect of the present invention is to provide a tool fixture device for positioning tools to repair defects adjacent to the sealing grooves in a pressure vessel head. The device includes: (a) at least two parallel, spaced apart, arcuate segments adapted to fit into one of the sealing grooves; (b) means for expanding the ends of the parallel arcuate segments to engage the inside walls of one of the grooves to hold the fixture in place; and (c) means for attaching a repair tool to the segments to permit the repair tool to be used to repair defects adjacent to the sealing grooves.

Another aspect of the present invention is to provide a tool fixture device for positioning tools to repair defects adjacent to the sealing grooves in a pressure vessel head. The device includes: (a) a first pair of parallel, spaced apart, arcuate segments adapted to fit into one of the sealing grooves; (b) a second pair of parallel, spaced apart, arcuate segments adapted to fit into the other one of the sealing grooves; (c) a support plate attached to the first and the second pair of parallel, spaced apart, arcuate segments for attaching a repair tool to the segments to permit the repair tool to be used to repair defects adjacent to the sealing grooves; and (d) means for expanding the ends of the parallel arcuate segments to engage the inside walls of one of the grooves to hold the fixture in place.

Still another aspect of the present invention is to provide a tool fixture device for positioning tools to repair defects adjacent to the sealing grooves in a pressure vessel head. The device includes: (a) a first pair of parallel, spaced apart, arcuate segments adapted to fit into one of the sealing grooves; (b) a second pair of parallel, spaced apart, arcuate segments adapted to fit into the other one of the sealing grooves; (c) a support plate attached to the first and the second pair of parallel, spaced apart, arcuate segments; (d) means for expanding the ends of the parallel arcuate segments to engage the inside walls of one of the grooves to hold the fixture in place; and (e) a tool positioner adapted to be attached to the support plate for positioning a repair tool to permit the repair tool to be used to repair defects adjacent to the sealing grooves.

These and other aspects of the present invention will become apparent to those skilled in the art after a reading of the following description of the preferred embodiment when considered with the drawings.

DESCRIPTION OF THE PREFERRED EMBODIMENTS

Figure 1:
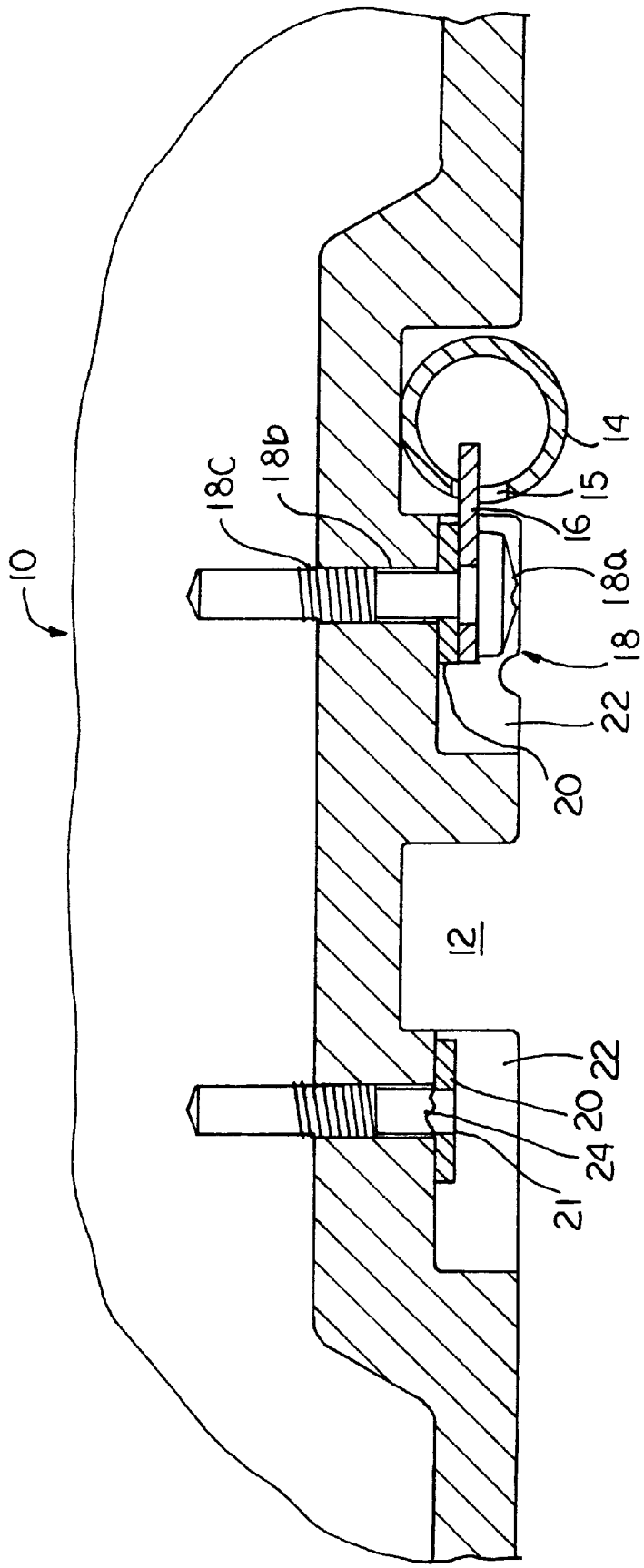
FIG. 1 is a partial sectional view of a nuclear reactor pressure vessel head taken through the concentric O-rings seals.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a partial sectional view of the reactor PV head 10 taken through the concentric O-rings 14 which seal the PV is shown.

Each O-ring 14 is seated in an O-ring recess 12 such that a portion of the O-ring rests in the recess 12 and a portion of the O-ring extends below the bottom surface of the head 10. The O-ring 14 is held in place by a plurality of clips 16 which extend into opening 15 to clamp O-ring 14 securely in place. Each clip 16 is held in place by narrow shank screw 18 located in screw recess 22.

It will be appreciated that should screw 18 become loose gravity will cause it to drop down into the reactor core potentially causing operational problems. This possibility is addressed by the design of screw 18 along with the provision of backing plate 20.

Screw 18 includes head 18a, shank 18b and threads 18c. Shank 18b is specially machined so that it has a diameter less than that of threads 18c. This diameter is complementary with the opening in backing plate 20 such that while shank 18b will fit inside the backing plate opening 21, threads 18c will not. Thus, should the screw 18 over time become loose it will fall no further than the distance between head 18a and the beginning of threads 18c. Typically each backing plate 20 is spot welded into position in screw recess 22.

Occasionally, screw 18 may be damaged or broken. A broken screw 24 is illustrated in FIG. 1. Given the relationship between the thread diameter and the shank diameter discussed above, broken screw 24 cannot be removed without first removing backing plate 20. It will be appreciated that a new O-ring 14 may not be held in place securely with only a limited number of screws 18 available to hold clips 16 in place. This loss of support can cause the new O-ring to sag and bend and to become permanently damaged during installation.

A typical repair scheme includes using a hammer and chisel to break the tack weld holding backing plate 20 in place in screw recess 22. However, if the tack weld holding backing plate 20 in place is excessively large, backing plate 20 cannot be removed with a hammer and chisel. Some sort of power tool must be used. The tool positioning device of the present invention addresses the need to position such a power tool accurately over the repair site and to hold the tool in that position for the duration of a repair.

Figure 2:
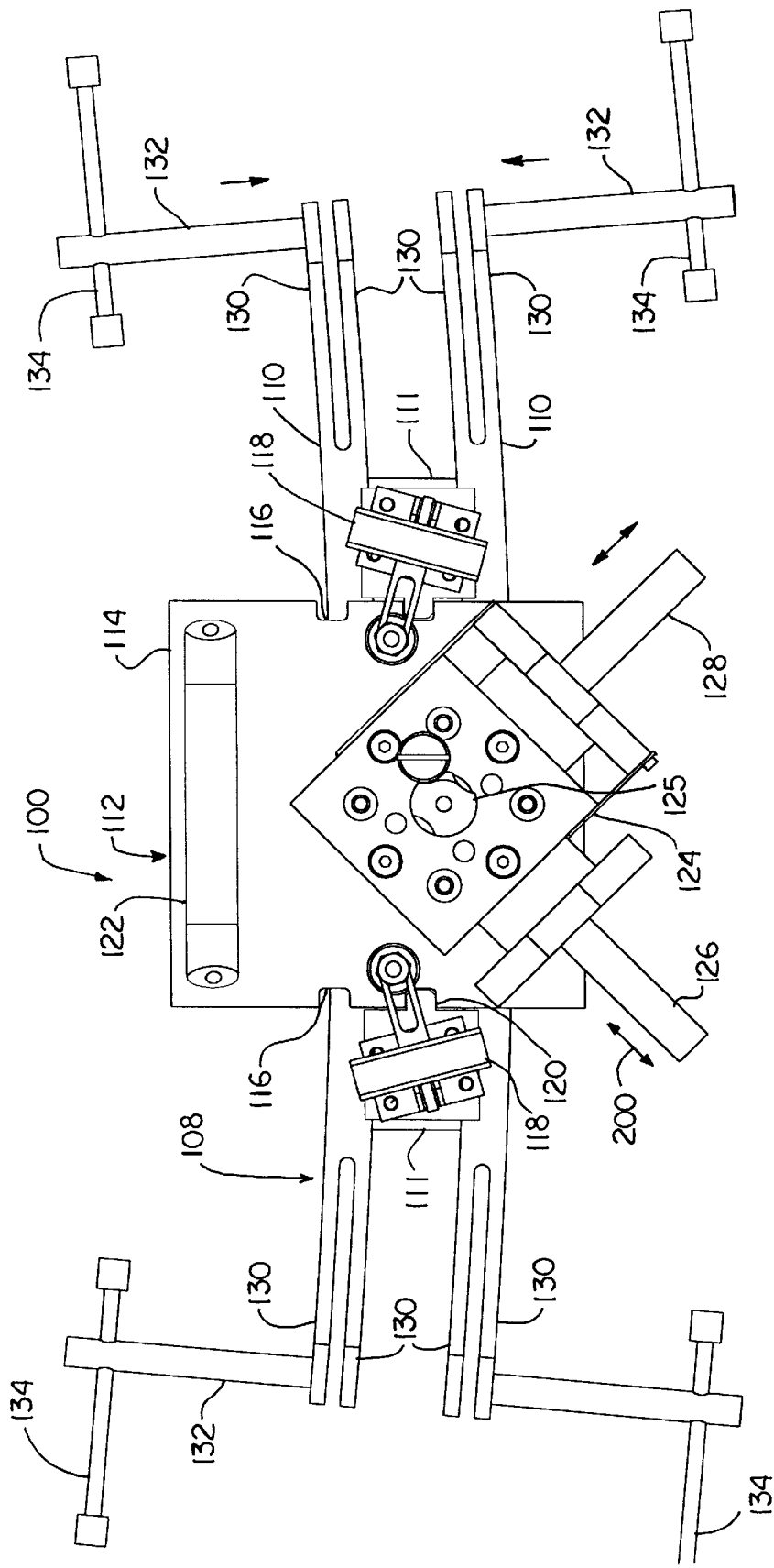
FIG. 2 is a bottom view of a tool positioning device constructed according to the present invention.
Figure 3:
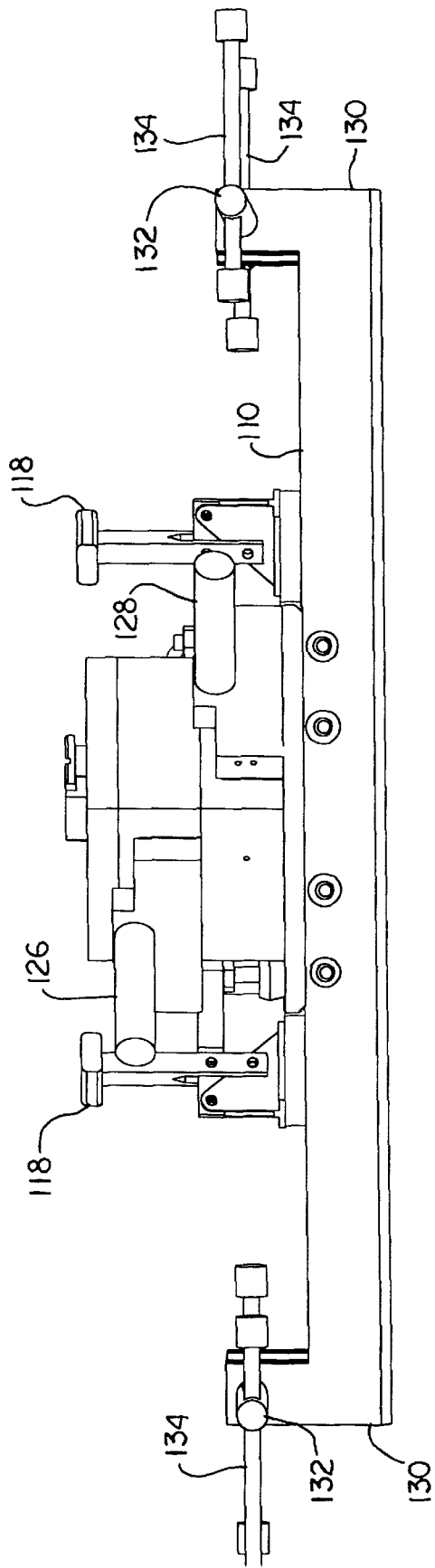
FIG. 3 is a side view of the tool positioning device of the present invention.

A bottom view of a tool positioning device, generally designated 100, constructed according to the present invention, is shown in FIG. 2. The device includes a tool fixture 108 and a tool positioner 112 adapted to be attached to the tool fixture 108. The tool fixture includes at least two parallel, spaced apart, arcuate segments 110 which are held in parallel relationship by connecting members 111. Extending from opposing ends of arcuate segments 110 are L-shaped fingers 130. The upright portion (extending out of the page) of each L-shaped finger 130 which is perpendicular to arcuate segments 110 houses a means for expanding the segments as explained below. The segment portion that is perpendicular to the upright portion (See FIG. 3.) engages O-ring grooves 12 as explained in more detail below.

Each pair of fingers 130 includes a means for expanding the segments 110 against the sides of the groove 12. In the preferred embodiment illustrated in FIG. 2, at least one of the fingers is threaded to receive threaded rod 132. Threaded rod 132 may be extended into expanding contact with an adjacent finger 130 through the use of sliding handle 134. As will be readily appreciated in the side view shown in FIG. 3, each set of fingers 130 is inserted into O-ring grooves 12 on either side of a site to be repaired. Then each threaded rod 132 is screwed through one finger 130 into expanding contact with an adjacent finger 130 so as to force the fingers apart against the sidewalls of groove 12 to hold the device in place. Once all four sets of fingers 130 are expanded against the sidewalls of groove 12, the tool positioning device will remain in place on the underside of the PV head without further human intervention.

Tool positioner 112 includes a planar table 114 on which is mounted handle 122 and tool jig 124. Tool jig 124 is mounted on planar table 114 substantially perpendicular thereto. Planar table 114 is held in position on arcuate segments 110 by at least one toggle clamp 118. Preferably, two toggle clamps are used one on either side of tool jig 124.

Planar table 114 further includes a means for indexing the position of tool jig 124 with respect to either of the concentric grooves. In a preferred embodiment the means for indexing the position of tool jig 124 includes tabs 120 extending from connecting members 111 for securing engagement with a plurality of positioning slots 116 located on either side of planar table 114. It will be appreciated that the two sets of slots 116 on either side of planar table 114 permit tool jig 124 to be positioned for work in either groove without moving the tool fixture. Once the desired set of positioning slots 116 is engaged with tabs 120, toggle clamps 118 are brought over and snapped into position against planar table 114 to hold planar table 114 and thus tool jig 124 in secure position.

The planar table 114 is a XY table for precisely positioning a repair tool. That is, the table permits the exact positioning of a tool using a two-coordinate x,y grid approach.

Tool jig 124 includes at least a first micrometer slide 126 for back and forth adjustment as shown by arrow 200. Preferably the invention will also include a second micrometer slide 128 for movement along a second direction of travel as illustrated by arrows 200, 201. Although directions of travel 200, 201 are shown as being substantially perpendicular to each other in FIG. 2, they may be aligned at other angles as well. Tool jig 124 preferably includes a tool opening 125 for precisely positioning the repair tool. The opening 125 provides access to either backing plate 20 or to another work area. Tool opening 125 is positioned as desired by the operation of micrometer slides 126, 128. A suitable tool jig for the practice of the present invention includes the Model R735XY available from the Del-Tron company of Bethel, Conn. It will be readily understood that other types of commercially available tool positioners may be adapted for the practice of the present invention.

Figure 4:
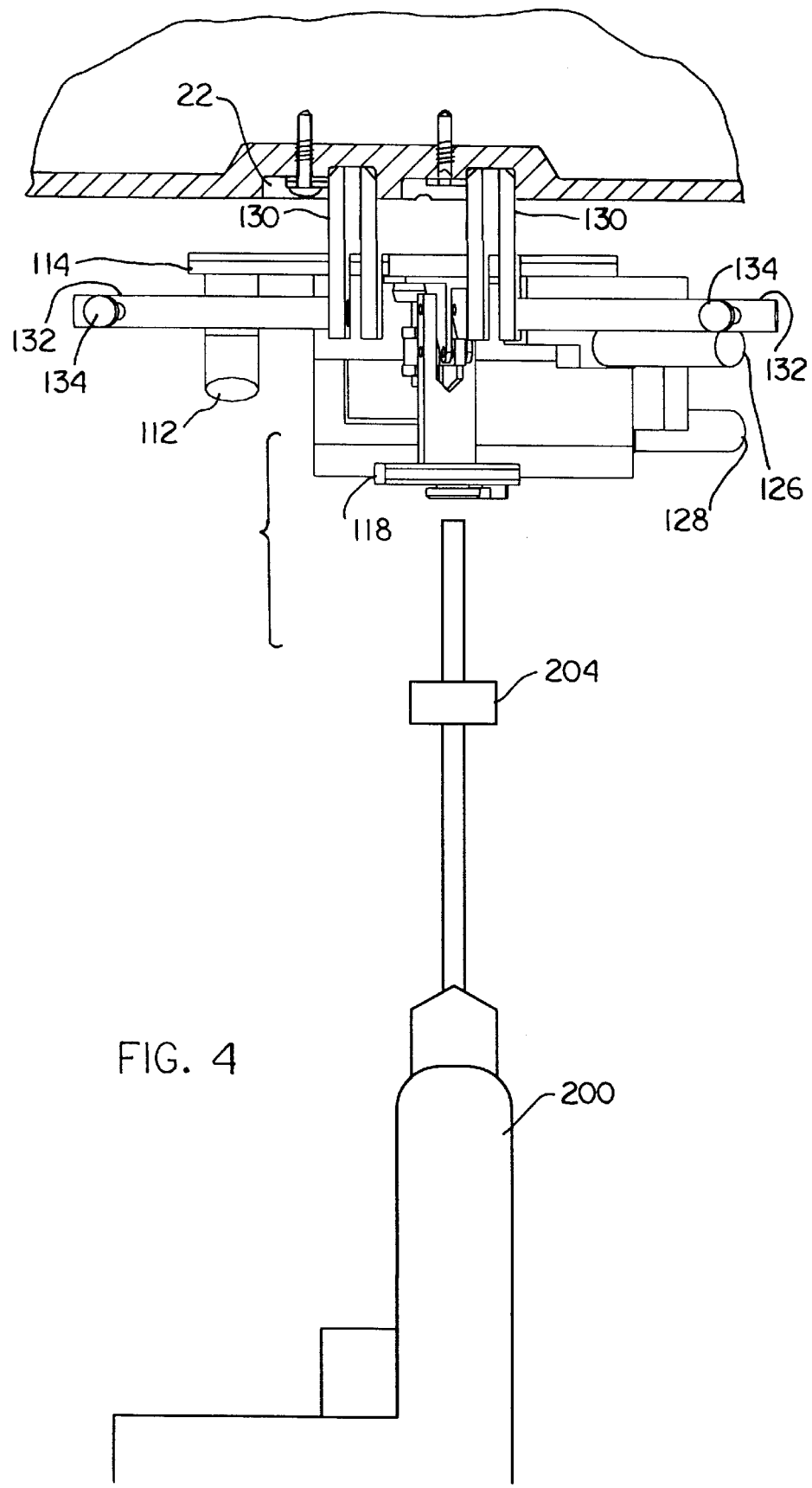
FIG. 4 is a side view of the tool positioning device of the present invention shown attached to the O-ring grooves of a nuclear reactor pressure vessel.

A side view of the tool fixture 108 positioned in a PV head is shown in FIG. 4. L-shaped fingers 130 extend into each grove 12 and are held against the sides thereof by the action of threaded rods 132. It can be readily appreciated that the tool fixture 108 and tool positioner 112 are substantially perpendicular to the plane of the underside of the PV head.

In operation, once tool fixture 108 is secured in place, micrometer slides 126, 128 are adjusted as needed to position tool opening 125 over groove 12. An end mill 204 operated by drill motor 200 is shown just before being inserted into too opening 125 for removing the tack weld holding backing plate 20 in place. A drill stop 6 may also be used to limit the operating depth of end mill 204. The practice of the present invention includes using a variety of other tools as needed to make the necessary repairs.

The present invention has several advantages over other tools used for repairs inside groove type openings. First the tool fixture is compact, lightweight and can be installed easily. Once installed, the tool fixture permits a variety of different tools to be used without significant additional set up work. The invention may be modified readily to fit the particular dimensions of a particular reactor.

None of the commonly used alternatives to the present invention are as attractive for this type of repair. Items such as portable milling machines, hand grinders, electric discharge machining (EDM) and thermal/flame cutting do not permit the simple tool positioning and depth control possible with the present invention. In particular, lack of adequate depth control may result in complete penetration of PV head cladding resulting in exposure of the carbon steel base metal.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. A tool fixture device for positioning tools to repair defects adjacent to the sealing grooves in a pressure vessel head, said device comprising:
   (a) at least two parallel, spaced apart, arcuate segments adapted to fit into one of said sealing grooves;
   (b) means for expanding the ends of said parallel arcuate segments to engage the inside walls of one of said grooves to hold said fixture in place; and
   (c) means for attaching a repair tool to said segments to permit said repair tool to be used to repair defects adjacent to said sealing grooves.

2. The device according to claim 1, further including a tool positioner adapted to be attached to said tool fixture.

3. The device according to claim 2, wherein said tool positioner includes a planar table and a tool jig attached to said planar table for receiving said repair tool.

4. The device according to claim 3, wherein said planar table includes a plurality of indexing slots along at least one edge and said tool fixture includes a corresponding tab whereby said planar table may be positioned along discrete intervals on said tool fixture.

5. The device according to claim 3, wherein said tool jig attached to said planar table for receiving said repair tool includes a XY table for precisely positioning said repair tool.

6. The device according to claim 3, wherein said tool jig attached to said planar table for receiving said repair tool includes a tool opening for precisely positioning said repair tool.

7. The device according to claim 6, wherein said tool opening for precisely positioning said repair tool is a drill guide.

8. A tool fixture device for positioning tools to repair defects adjacent to the sealing grooves in a pressure vessel head, said device comprising:
   (a) a first pair of parallel, spaced apart, arcuate segments adapted to fit into one of said sealing grooves;
   (b) a second pair of parallel, spaced apart, arcuate segments adapted to fit into the other one of said sealing grooves;
   (c) a support plate attached to said first and said second pair of parallel, spaced apart, arcuate segments for attaching a repair tool to said segments to permit said repair tool to be used to repair defects adjacent to said sealing grooves; and
   (d) means for expanding the ends of said parallel arcuate segments to engage the inside walls of one of said grooves to hold said fixture in place.

9. The device according to claim 8, wherein the ends of said parallel arcuate segments are L-shaped and extend downwardly into said grooves to provide additional attachment area.

10. The device according to claim 8, wherein said means for expanding the ends of said parallel arcuate segments to engage the inside walls of one of said grooves to hold said fixture in place is a threaded rod extending through one of said parallel arcuate segments and contacting the other of said parallel arcuate segments, whereby turning said threaded rod expands the end of said parallel arcuate segment.

11. The device according to claim 10, wherein said threaded rod extending through one of said parallel arcuate segments and contacting the other of said parallel arcuate segments includes a sliding handle to permit said threaded rod to be turned in close quarters.

12. The device according to claim 8, wherein said support plate attached to said first and said second pair of parallel, spaced apart, arcuate segments for attaching a repair tool to said segments to permit said repair tool to be used to repair defects adjacent to said sealing grooves includes at least one pair of toggle clamps to attach said repair tool to said segments.

13. A tool fixture device for positioning tools to repair defects adjacent to the sealing grooves in a pressure vessel head, said device comprising:
   (a) a first pair of parallel, spaced apart, arcuate segments adapted to fit into one of said sealing grooves;
   (b) a second pair of parallel, spaced apart, arcuate segments adapted to fit into the other one of said sealing grooves;
   (c) a support plate attached to said first and said second pair of parallel, spaced apart, arcuate segments;
   (d) means for expanding the ends of said parallel arcuate segments to engage the inside walls of one of said grooves to hold said fixture in place; and
   (e) a tool positioner adapted to be attached to said support plate for positioning a repair tool to permit said repair tool to be used to repair defects adjacent to said sealing grooves.

14. The device according to claim 13, wherein said tool positioner includes a planar table and a tool jig attached to said planar table for receiving said repair tool.

15. The device according to claim 14, wherein said planar table includes a plurality of indexing slots along at least one edge and said tool fixture includes a corresponding tab whereby said planar table may be positioned along discrete intervals on said tool fixture.

16. The device according to claim 14, wherein said tool jig attached to said planar table for receiving said repair tool includes a XY table for precisely positioning said repair tool.

17. The device according to claim 14, wherein said tool jig attached to said planar table for receiving said repair tool includes a tool opening for precisely positioning said repair tool.

18. The device according to claim 17, wherein said tool opening for precisely positioning said repair tool is a drill guide.

19. The device according to claim 13, wherein the ends of said parallel arcuate segments are L-shaped and extend downwardly into said grooves to provide additional attachment area.

20. The device according to claim 13, wherein said means for expanding the ends of said parallel arcuate segments to engage the inside walls of one of said grooves to hold said fixture in place is a threaded rod extending through one of said parallel arcuate segments and contacting the other of said parallel arcuate segments, whereby turning said threaded rod expands the end of said parallel arcuate segment.

21. The device according to claim 20, wherein said threaded rod extending through one of said parallel arcuate segments and contacting the other of said parallel arcuate segments includes a sliding handle to permit said threaded rod to be turned in close quarters.

22. The device according to claim 13, wherein said support plate attached to said first and said second pair of parallel, spaced apart, arcuate segments includes at least one pair of toggle clamps to attach said tool positioner to said segments.

* * * * *